US011887322B2

(12) United States Patent
Cowburn et al.

(10) Patent No.: US 11,887,322 B2
(45) Date of Patent: *Jan. 30, 2024

(54) DEPTH ESTIMATION USING BIOMETRIC DATA

(71) Applicant: Snap Inc., Santa Monica, CA (US)

(72) Inventors: Piers George Cowburn, London (GB); David Li, London (GB); Isac Andreas Müller Sandvik, London (GB); Qi Pan, London (GB)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/165,201

(22) Filed: Feb. 6, 2023

(65) Prior Publication Data
US 2023/0186498 A1    Jun. 15, 2023

Related U.S. Application Data

(63) Continuation of application No. 16/983,751, filed on Aug. 3, 2020, now Pat. No. 11,580,657.
(Continued)

(51) Int. Cl.
*G06T 7/536*       (2017.01)
*G06T 19/00*      (2011.01)
(Continued)

(52) U.S. Cl.
CPC ............... *G06T 7/536* (2017.01); *G06T 7/70* (2017.01); *G06T 17/00* (2013.01); *G06T 19/006* (2013.01);
(Continued)

(58) Field of Classification Search
CPC .......... G06T 7/536; G06T 7/70; G06T 17/00; G06T 19/006; G06T 2207/10016;
(Continued)

(56) References Cited

U.S. PATENT DOCUMENTS

| 11,580,657 B2 | 2/2023 | Cowburn et al. |
| 2008/0158409 A1 | 7/2008 | Gotanda |

(Continued)

FOREIGN PATENT DOCUMENTS

| CN | 101086604 A | 12/2007 |
| CN | 101210995 A | 7/2008 |

(Continued)

OTHER PUBLICATIONS

"U.S. Appl. No. 16/983,751, Non Final Office Action dated Apr. 27, 2022", 9 pgs.
(Continued)

*Primary Examiner* — Ryan R Yang
(74) *Attorney, Agent, or Firm* — SCHWEGMAN LUNDBERG & WOESSNER, P.A.

(57) ABSTRACT

Method of generating depth estimate based on biometric data starts with server receiving positioning data from first device associated with first user. First device generates positioning data based on analysis of a data stream comprising images of second user that is associated with second device. Server then receives a biometric data of second user from second device. Biometric data is based on output from a sensor or a camera included in second device. Server then determines a distance of second user from first device using positioning data and biometric data of the second user. Other embodiments are described herein.

18 Claims, 10 Drawing Sheets

Related U.S. Application Data

(60) Provisional application No. 63/002,128, filed on Mar. 30, 2020.

(51) Int. Cl.
*G06T 17/00* (2006.01)
*G06T 7/70* (2017.01)

(52) U.S. Cl.
CPC .............. *G06T 2207/10016* (2013.01); *G06T 2207/10028* (2013.01); *G06T 2207/30201* (2013.01); *G06T 2219/024* (2013.01)

(58) Field of Classification Search
CPC . G06T 2207/10028; G06T 2207/30201; G06T 2219/024; G06T 2207/10012; G06T 2207/30196; G06V 20/20; G06V 40/161; G06V 40/20; G06F 3/011; G02B 2027/0138; G02B 2027/014; G02B 27/017; G02B 7/28; G02B 27/0093
See application file for complete search history.

(56) References Cited

U.S. PATENT DOCUMENTS

| | | |
|---|---|---|
| 2012/0121126 A1 | 5/2012 | Hwang et al. |
| 2012/0130284 A1* | 5/2012 | Ma .................... G01C 21/1654 600/595 |
| 2012/0212508 A1 | 8/2012 | Kimball |
| 2014/0277757 A1 | 9/2014 | Wang et al. |
| 2016/0048202 A1 | 2/2016 | Hwang et al. |
| 2017/0347015 A1 | 11/2017 | Pan |
| 2018/0024633 A1 | 1/2018 | Lo |
| 2019/0199935 A1 | 6/2019 | Danielsen et al. |
| 2019/0265784 A1 | 8/2019 | Akahori |
| 2021/0117708 A1 | 4/2021 | Sandhan et al. |
| 2021/0304429 A1 | 9/2021 | Cowburn et al. |

FOREIGN PATENT DOCUMENTS

| | | |
|---|---|---|
| CN | 105578018 A | 5/2016 |
| CN | 111707374 A | 9/2020 |
| CN | 115516406 A | 12/2022 |
| JP | 2017204156 A | 11/2017 |
| KR | 100781170 B1 | 11/2007 |
| WO | WO-2013154562 A1 | 10/2013 |
| WO | WO-2018067357 A2 | 4/2018 |
| WO | WO-2021203134 A1 | 10/2021 |

OTHER PUBLICATIONS

"U.S. Appl. No. 16/983,751, Notice of Allowance dated Oct. 14, 2022", 7 pgs.

"U.S. Appl. No. 16/983,751, Response filed Jul. 26, 2022 to Non Final Office Action dated Apr. 27, 2022", 8 pgs.

"International Application Serial No. PCT/US2021/070341, International Preliminary Report on Patentability dated Oct. 13, 2022", 8 pgs.

"International Application Serial No. PCT/US2021/070341, International Search Report dated Jul. 12, 2021", 5 pgs.

"International Application Serial No. PCT/US2021/070341, Written Opinion dated Jul. 12, 2021", 6 pgs.

"Chinese Application Serial No. 202180032389.6, Office Action dated Jun. 28, 2023", W/English Translation, 13 pgs.

* cited by examiner

DEPTH ESTIMATION USING BIOMETRIC DATA

CLAIM OF PRIORITY

This application is a continuation of U.S. patent application Ser. No. 16/983,751, filed Aug. 3, 2020, which application claims the benefit of priority to U.S. Provisional Application Ser. No. 63/002,128, filed on Mar. 30, 2020, which is incorporated herein by reference in its entirety.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. The AR system aims to generate and present virtual objects that interact realistically with a real-world environment and with each other. Examples of AR applications can include single or multiple player video games, instant messaging systems, etc.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of an Augmented Reality (AR) creation software and system by using biometric data on a user to generate a depth estimation of the user. One first challenge of generating the AR scene is to identify how far away the user being tracked is from the client device that is tracking the user.

More specifically, a first user can be viewing an AR scene displayed on the first client device that includes a second user. In order to generate an AR scene on the first device that includes the second user, the AR system needs to determine the distance of the second user to the first client device in order to generate and present virtual objects that interact realistically with the second user (e.g., the real-world element) in the AR scene.

In one embodiment, while the first client device performs skeleton tracking that allows for augmented reality experiences that augment the second user's body or clothing, for example, the second client device transmits known biometric data of the second user that is used to generate the depth estimation (e.g., the distance of the second user to the first client device).

In one embodiment, the messaging server system receives a positioning data from a first client device and a biometric data from a second client device. The messaging server system determines the distance of the user from the first client device based on the positioning data and/or the biometric data. In another embodiment, the second client device transmits the biometric data to the first client device and the first client device determines the distance of the user from the first client device based on the positioning data and/or the biometric data.

Figure 1:
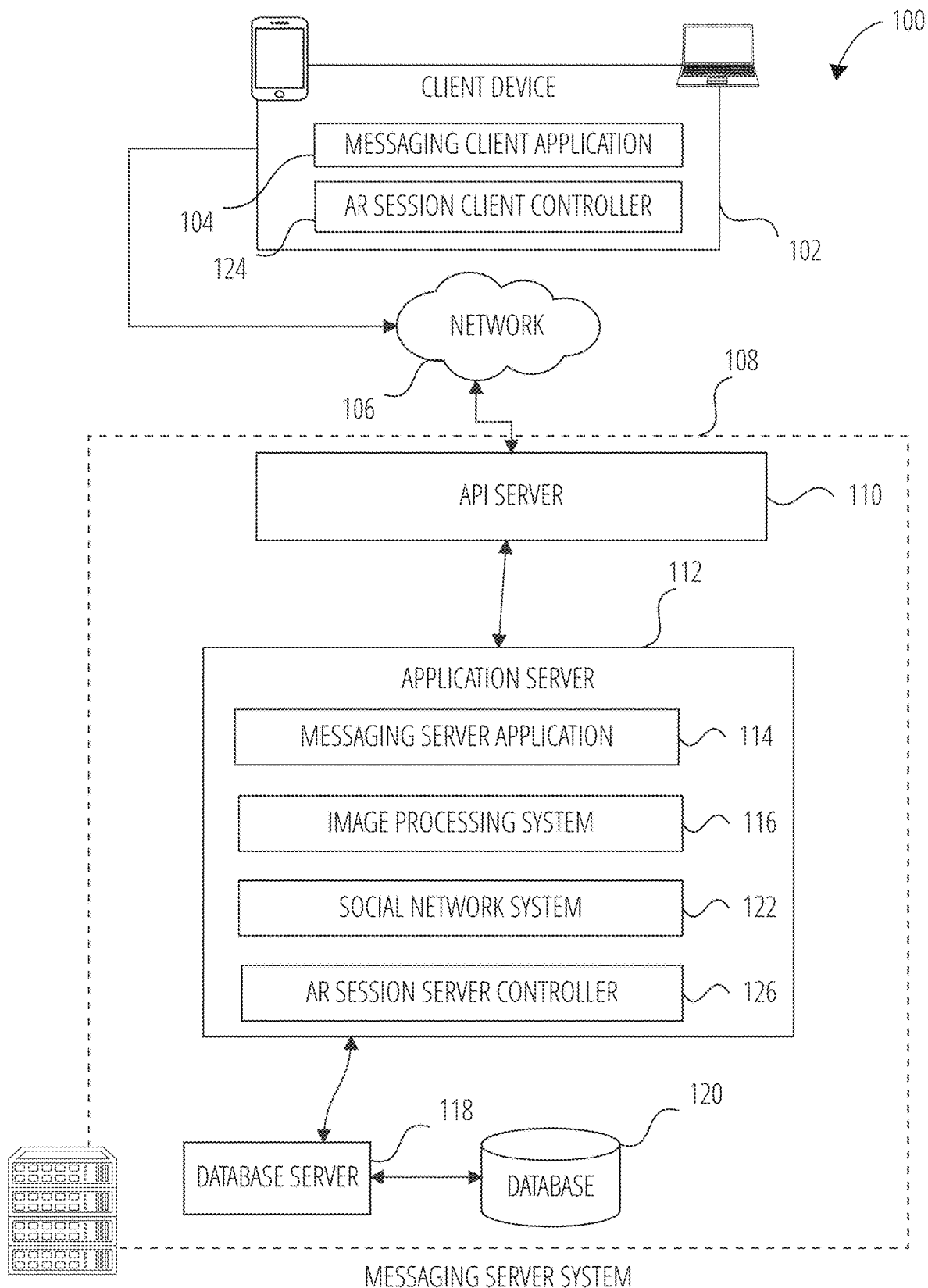
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104 and an AR session client controller 124. Each messaging client application 104 is communicatively coupled to other instances of the messaging client application 104 and a messaging server system 108 via a network 106 (e.g., the Internet). Each AR session client controller 124 is communicatively coupled to other instances of the AR session client controller 124 and an AR session server controller 126 in the messaging server system 108 via the network 106.

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

The AR session client controller 124 is able to communicate and exchange data with another AR session client controller 124 and with the AR session server controller 126 via the network 106. The data exchanged between the plurality of AR session client controllers 124, and between the AR session client controller 124 and the AR session server controller 126 can include a positioning data, a biometric data, a depth estimation (e.g., distance of a user from a client device tracking the user), a request to create a shared AR session, an identification of a user in a data stream (images or video), a session identifier that identifies the shared AR session, the transformation between a first device and a second device (e.g., plurality of client devices 102 include the first and a second device), a common coordinate frame, functions (e.g., commands to invoke functions) as well as other payload data (e.g., text, audio, video or other multimedia data).

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
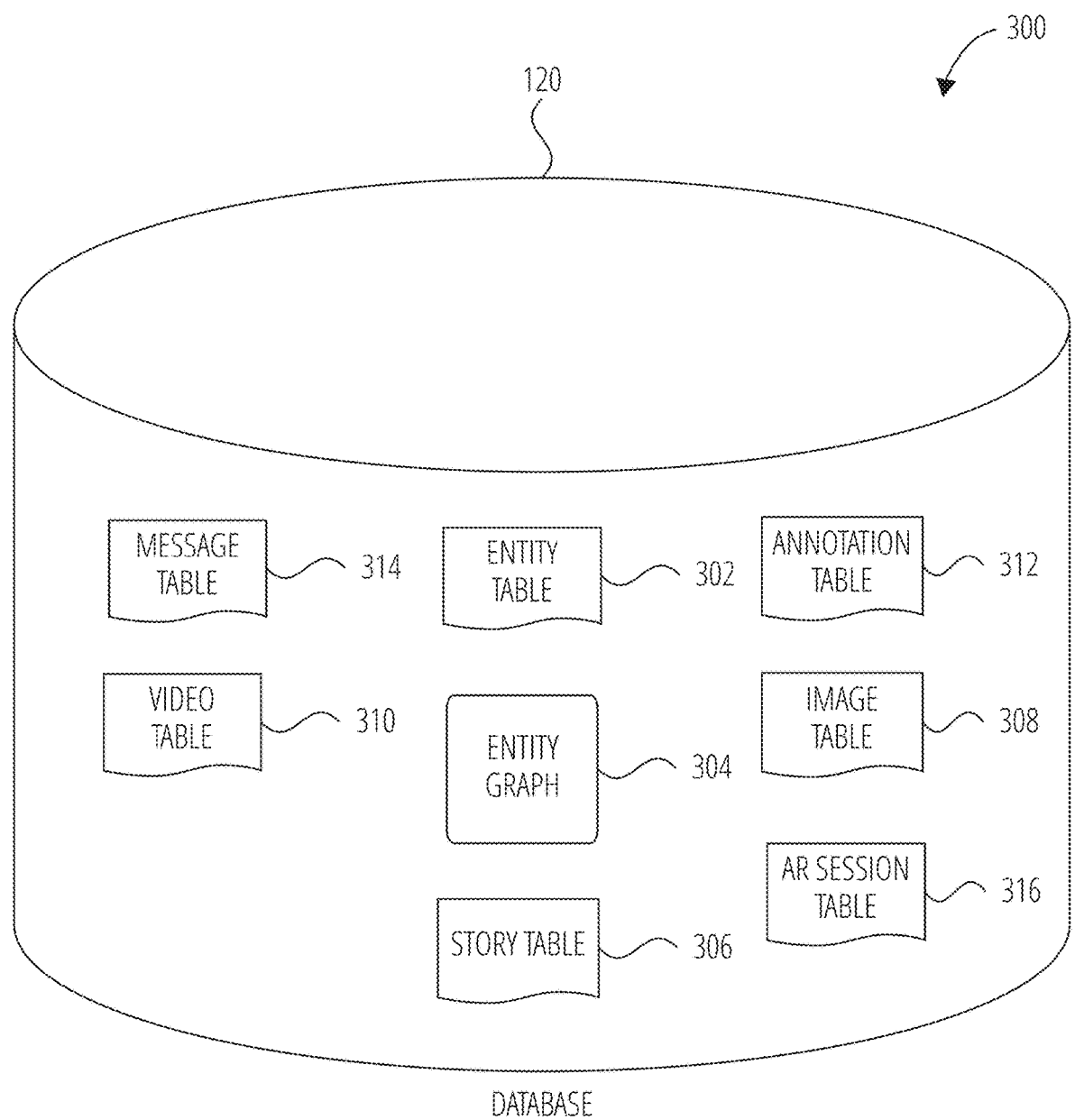
FIG. 3 is a diagrammatic representation of a data structure as maintained in a database, in accordance with some example embodiments.

The social network system 122 supports various social networking functions services and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The application server 112 also includes the AR session server controller 126 that can communicate with the AR session client controller 124 in the client device 102 to establish individual or shared AR sessions. The AR session server controller 126 can also be coupled to the messaging server application 114 to establish an electronic group communication session (e.g., group chat, instant messaging) for the client devices in a shared AR session. The electronic group communication session can be associated with a session identifier provided by the client devices 102 to gain access to the electronic group communication session and to the shared AR session. In one embodiment, the client devices first gain access to the electronic group communication session and then obtain the session identifier in the electronic group communication session that allows the client devices to access to the shared AR session. In some embodiments, the client devices 102 are able to access the shared AR session without aid or communication with the AR session server controller 126 in the application server 112.

The application server 112 is communicatively coupled to a database server 118, which facilitates access to a database 120 in which is stored data associated with messages processed by the messaging server application 114.

Figure 2:
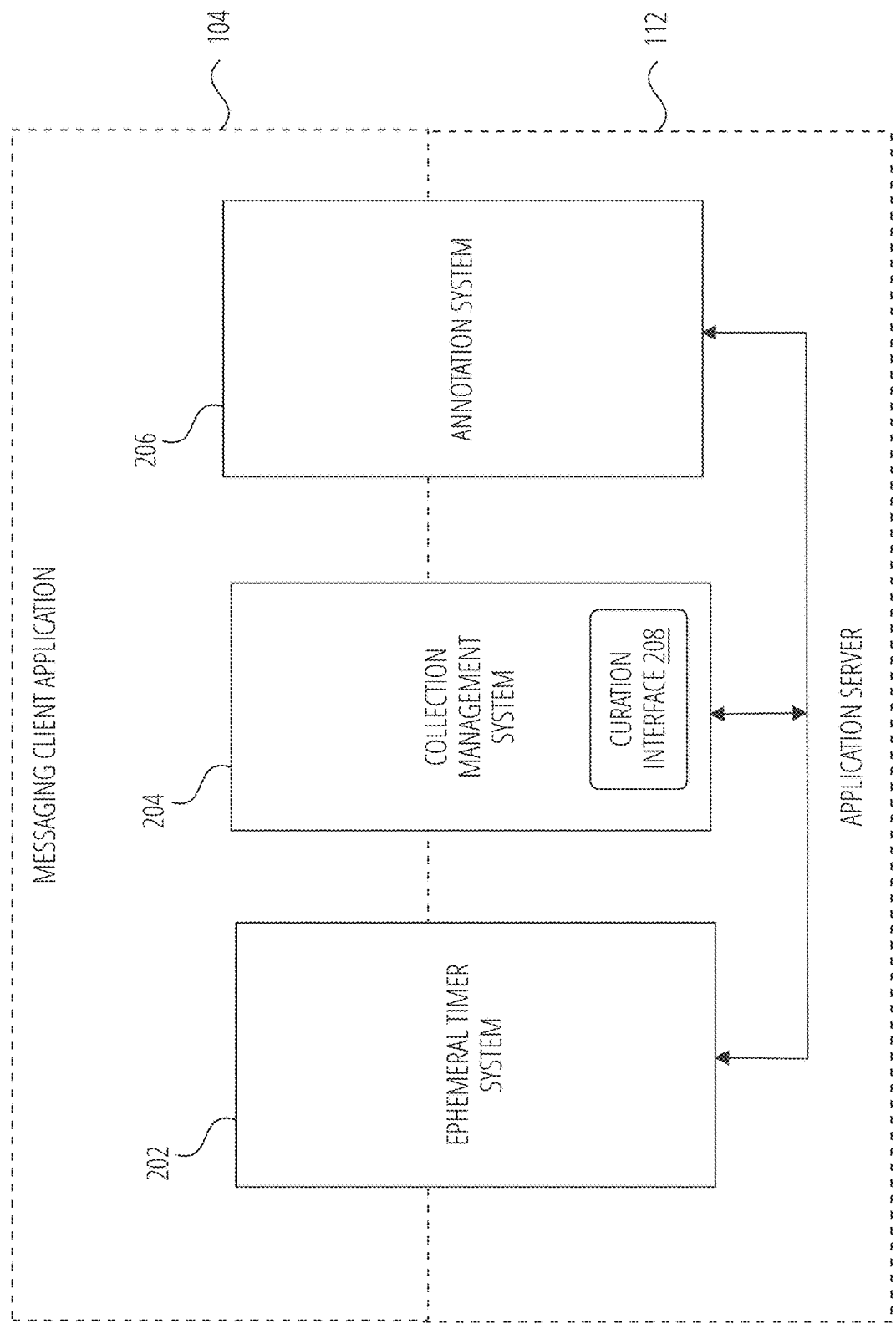
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device

102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content items (e.g., corresponding to applying Lenses or augmented reality experiences). An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 can also store data pertaining to individual and shared AR sessions in the AR session table 316.

The data in the AR session table 316 can include data communicated between the AR session client controller 124 and another AR session client controller 124, and data communicated between the AR session client controller 124 and the AR session server controller 126. Data can include the positioning data, the biometric data, the depth estimation, the identification of the user in a data stream (images or video), data used to establish the common coordinate frame of the shared AR scene, the transformation between the devices, the session identifier, etc.

Figure 4:
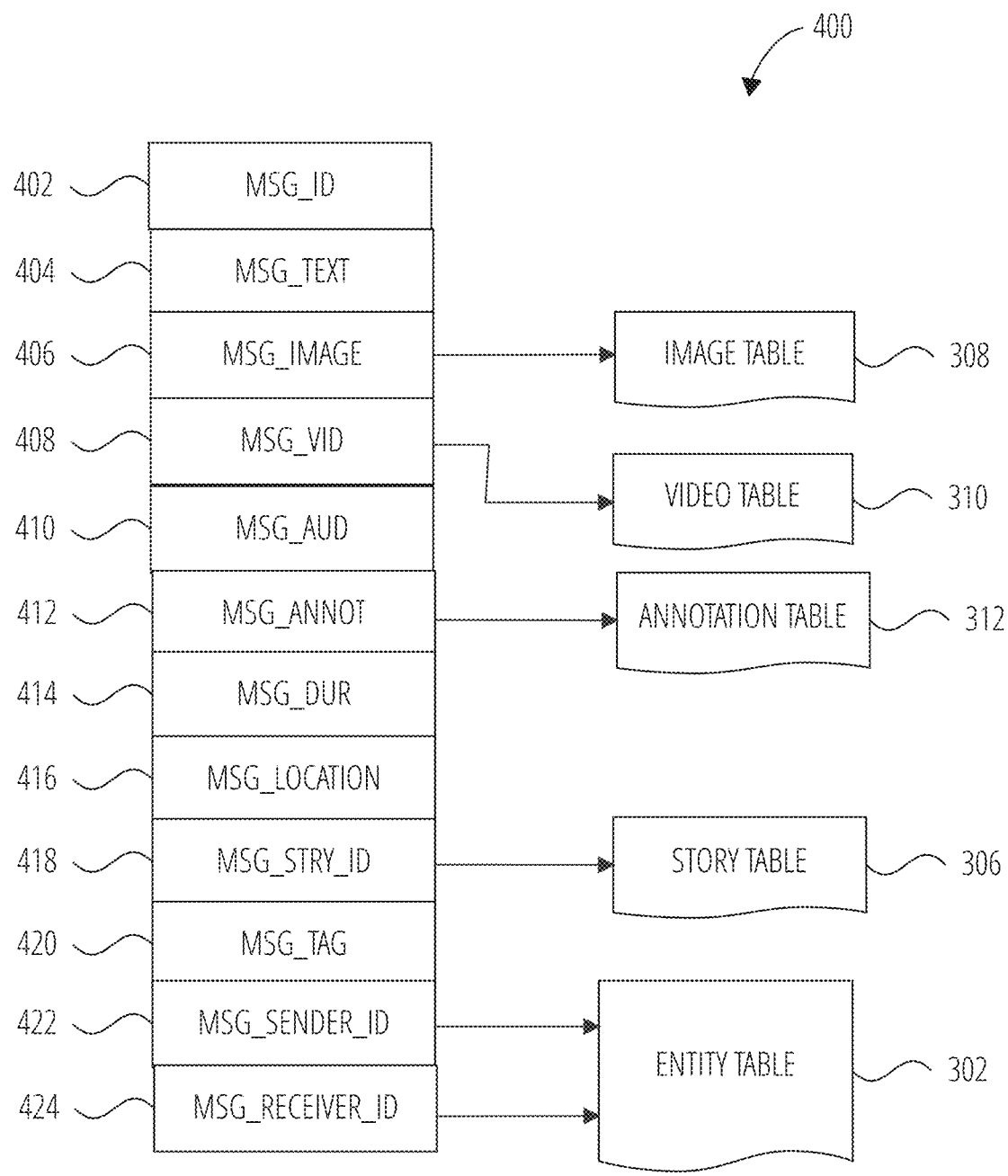
FIG. 4 is a diagrammatic representation of a message, in accordance with some example embodiments.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from a memory component of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from a memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent
- A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Although the following flowcharts can describe the operations as a sequential process, many of the operations can be performed in parallel or concurrently. In addition, the order of the operations may be re-arranged. A process is terminated when its operations are completed. A process may correspond to a method, a procedure, etc. The steps of methods may be performed in whole or in part, may be performed in conjunction with some or all of the steps in other methods, and may be performed by any number of different systems, such as the systems described in FIG. 1, and/or FIG. 9, or any portion thereof, such as a processor included in any of the systems.

Figure 5:
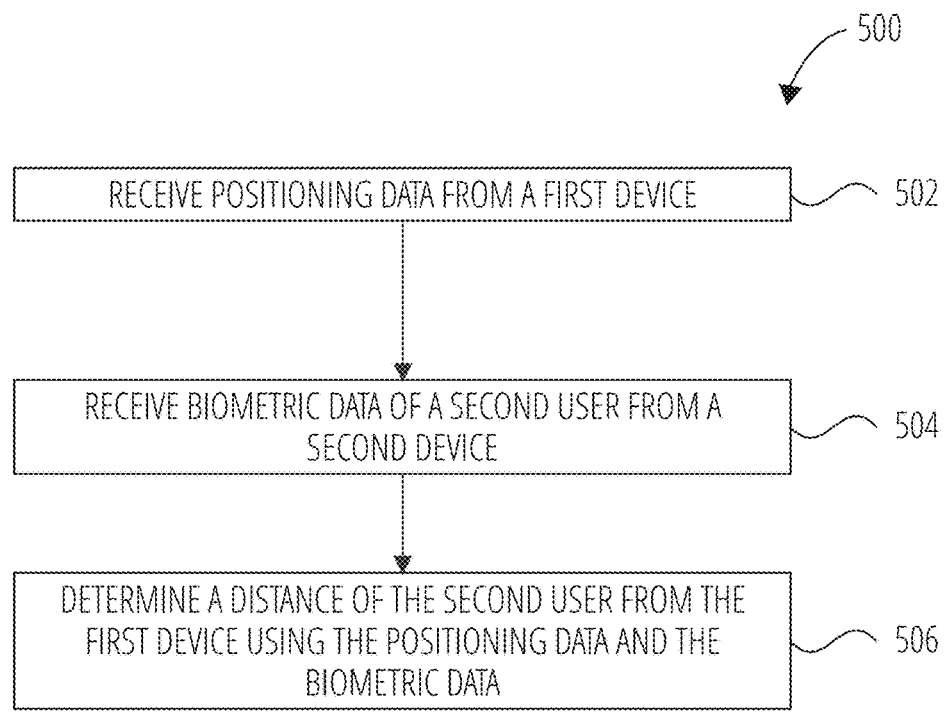
FIG. 5 is a flowchart for a process 500 of generating a depth estimation based on biometric data, in accordance with one embodiment.

FIG. 5 is a flowchart for a process 500 of generating a depth estimation based on biometric data, in accordance with one embodiment. In one embodiment, the process 500 can be performed by the AR session server controller 126 in the messaging server system 108 to determine the distance between a first client device 102 and a user of a second client device 102 (e.g., the second user). The first client device 102 and the second client device 102 can be included in a shared AR session. In one example, the shared AR session comprises a real-time messaging session.

Figure 7:
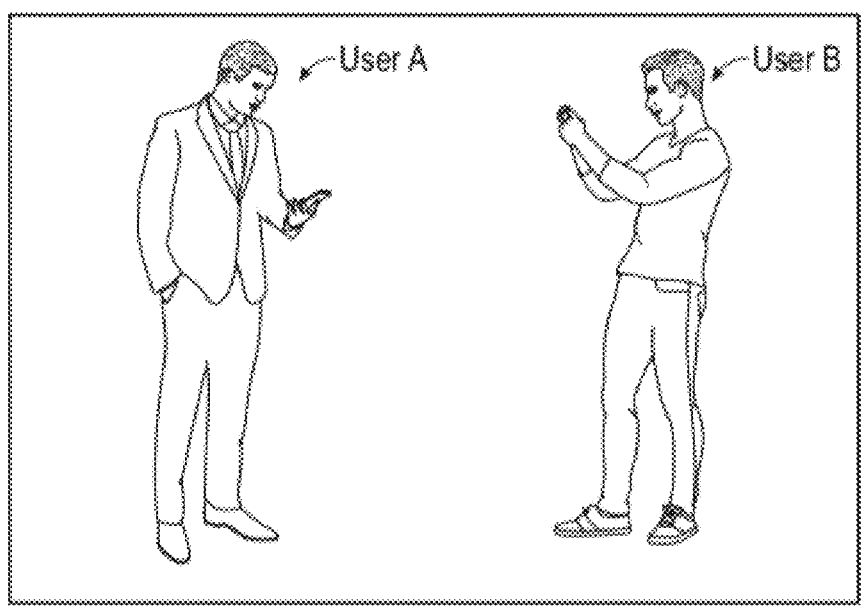
FIG. 7 illustrates an example 700 of a first user (user B) using the first client device 102 to capture images or a video of a second user (user A) in accordance with one embodiment.
Figure 8:
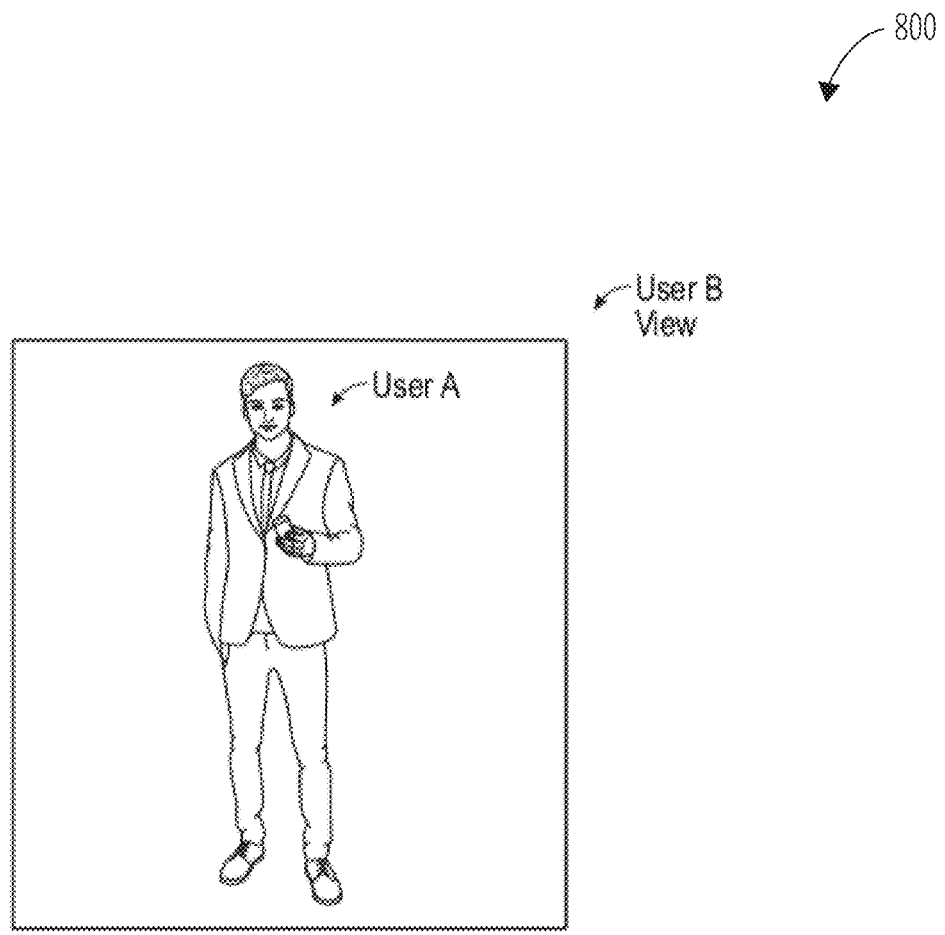
FIG. 8 illustrates an example 800 of an image captured using the camera included in the first client device 102 in accordance with one embodiment.

At operation 502, the AR session server controller 126 receives positioning data from a first client device 102 associated with a first user. In one embodiment, the first client device 102 generates the positioning data based on an analysis of a data stream comprising images of a second user associated with a second client device 102. The data stream can be a video of the second user. The first client device 102 can capture the data stream or video using a camera included in the first client device 102, as shown in FIG. 7, for example. As shown in FIG. 8, the field of view of the camera (or camera frame) can include the second user and can be displayed on a display of the first client device 102. In this embodiment, the first client device 102 can be tracking the second user in the images using skeleton tracking. In one embodiment, to generate the positioning data, the first client device 102 identifies a position or a pose of a skeleton of the second user in a camera frame. The first client device 102 can also generate the positioning data by identifying a position or a pose of a face of the second user in a camera frame. At this stage, the scale of the skeleton or the face and the distance of the second user from the first user (or first client device 102) may be ambiguous. For example, the distance may be ambiguous due to a lack of binocular cameras or depth sensors in the first client device 102.

At operation 504, the AR session server controller 126 receives from the second client device 102 a biometric data of the second user. The biometric data can be based on an output from a sensor or a camera included in the second device. For example, the biometric data can be based on an image of the second user captured by a camera included in the second client device 102. For example, the image of the second user can be captured by the front-facing camera included in the second client device 102. The second client device 102 can also generate the biometric data of the second user based on the output from depth sensors or binocular cameras included in the second client device 102. In one embodiment, the biometric data of the second user is a size of a face of the second user.

At operation 506, the AR session server controller 126 determines a distance of the second user from the first client device 102 using the positioning data and the biometric data of the second user. For example, using the positioning data, the AR session server controller 126 can determine the position of the skeleton of the second user in the data stream and identifies the second user's face in the data stream. The AR session server controller 126 can use the biometric data including the actual size of the second user's face to determine the ratio between dimensions of second user's face in the data stream and the actual size of the second user's face. The ratio can then be used by the AR session server controller 126 to determine a distance of the second user from the first client device 102 (e.g., the depth estimation).

By determining the depth estimation of the second user in the data stream, the first client device 102 is able to, for example, generate the augmented user experience including visual or sound effects to be applied to the image of the second user on the first client device 102 in the shared AR session that is displayed on the first client device 102. For example, the visual or sound effects can include costumes to be worn by the second user, effects to be applied to the second user's face, voice sound effects to be applied to the second user, etc.

Figure 6:
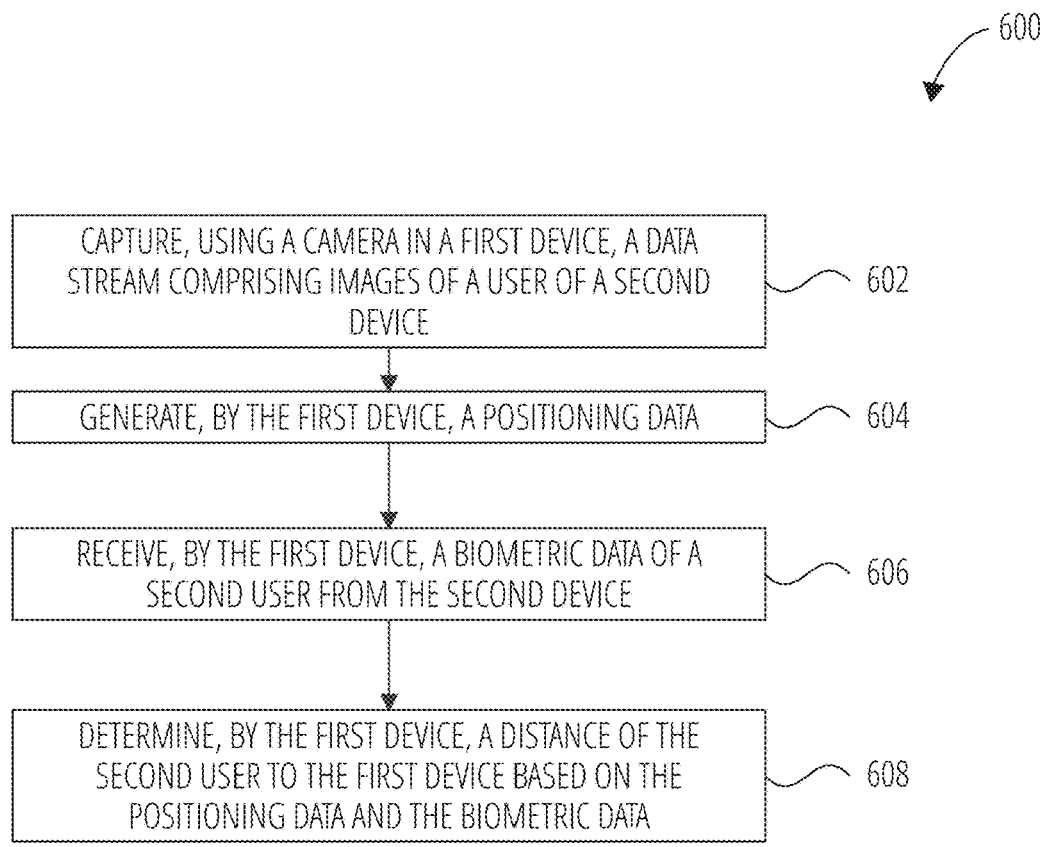
FIG. 6 illustrates a process 600 of generating a depth estimation based on biometric data, in accordance with one embodiment.

FIG. 6 illustrates a process 600 of generating a depth estimation based on biometric data, in accordance with one embodiment. In one embodiment, the process 600 can be performed by the AR session client controller 124 included in the first client device 102 to determine the distance between a first client device 102 and a user of a second client device 102 (e.g., the second user). The first client device 102 and the second client device 102 can be included in a shared AR session. In one example, the shared AR session comprises a real-time messaging session.

At operation 602, the AR session client controller 124 of the first client device 102 captures, using a camera included in the first client device 102, a data stream comprising images of a user of a second client device 102. As shown in FIG. 7, the first user (user B) captures using the camera in the first client device 102 images or a video of the second user (user A) of the second client device 102. The data stream can be a video of the second user (user A). As shown in FIG. 8, the field of view of the camera (or camera frame) can include the second user (user A) and can be displayed on a display of the first client device 102.

In one embodiment, at operation 604, the first client device 102 generates a positioning data based on an analysis of the data stream by identifying a position or a pose of a skeleton or a face of the user in a camera frame. In this embodiment, the first client device 102 can be tracking the user in the images using skeleton tracking. At this stage, the scale of the skeleton or the face and the distance of the user from the first client device 102 may be ambiguous. For example, the distance may be ambiguous due to a lack of binocular cameras or depth sensors in the first client device 102.

At operation 606, the AR session client controller 124 of the first client device 102 receives a biometric data of the user from the second client device 102. The biometric data can be based on an output from a sensor or a camera included in the second client device 102. For example, the biometric data can be based on an image of the user captured by a camera included in the second client device 102. For example, the image of the user can be captured by the front-facing camera included in the second client device 102. The second client device 102 can also generate the biometric data of the user based on the output from depth sensors or binocular cameras included in the second client device 102. In one embodiment, the biometric data of the user is a size of a face of the user.

The AR session client controller 124 of the first client device 102, at operation 608, determines a distance of the user from the first device using the positioning data and the biometric data of the user. For example, using the positioning data, the AR session server controller 126 can determine the position of the skeleton of the user in the data stream and identifies the user's face in the data stream. The AR session server controller 126 can use the biometric data including the actual size of the user's face to determine the ratio between dimensions of user's face in the data stream and the actual size of the user's face. The ratio can then be used by the AR session server controller 126 to determine a distance of the user from the first client device 102 (e.g., the depth estimation).

By determining the depth estimation of the user in the data stream, the first client device 102 is able to, for example, generate the augmented user experience including visual or sound effects to be applied to the image of the user on the first client device 102 in the shared AR session that is displayed on the first client device 102. For example, the visual or sound effects can include costumes to be worn by the second user, effects to be applied to the second user's face, voice sound effects to be applied to the second user, etc.

FIG. 7 illustrates an example 700 of a first user (user B) using the first client device 102 to capture images or a video of a second user (user A) in accordance with one embodiment. As shown in FIG. 7, the second user (user A) can be associated with a second client device 102. For example, the second user (user A) is holding the second client device 102 in FIG. 7. The second client device 102 generates the biometric data associated with the second user (user A) and transmits the biometric data to the AR session server controller 126 in the messaging server system 108 and/or to the AR session client controller 124 in the first client device 102.

FIG. 8 illustrates an example 800 of an image captured using the camera included in the first client device 102 in accordance with one embodiment. The image in FIG. 8 illustrates the second user (user A) within the field of view of the camera of the first client device 102. In one embodiment, the camera frame or the field of view of camera included in the first client device 102 including the second user (user A) is displayed on a display of the first client device 102.

Figure 9:
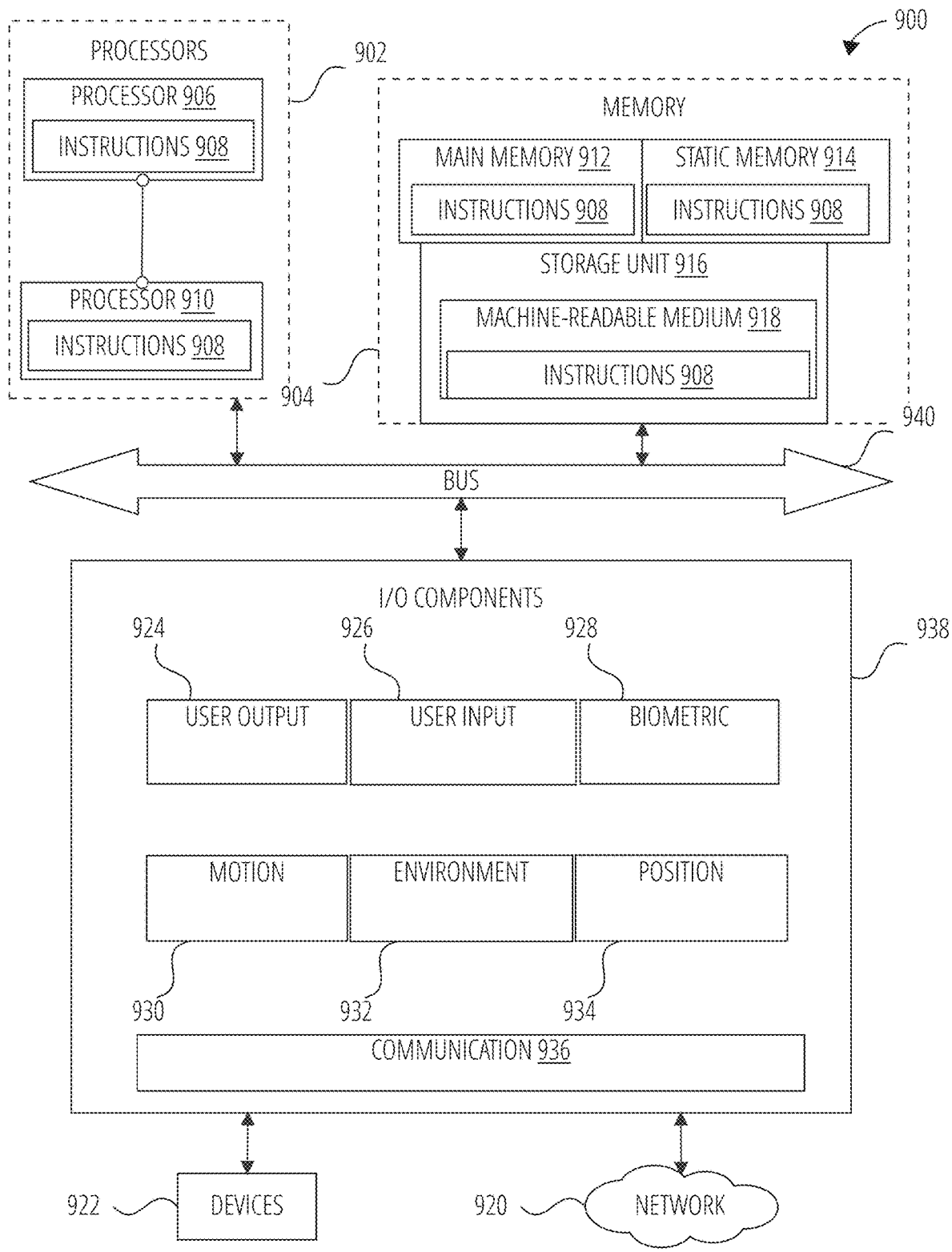
FIG. 9 is a diagrammatic representation of a machine in the form of a computer system within which a set of instructions may be executed for causing the machine to perform any one or more of the methodologies discussed herein, in accordance with some example embodiments.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 938, which may be configured to communicate with each other via a bus 940. In an example embodiment, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 906 and a Processor 910 that execute the instructions 908. The term "Processor" is intended to include multi-core processors that may comprise two or more independent processors (sometimes referred to as "cores") that may execute instructions contemporaneously. Although FIG. 9 shows multiple processors 902, the machine 900 may include a single Processor with a single core, a single Processor with multiple cores (e.g., a multi-core Processor), multiple processors with a single core, multiple processors with multiples cores, or any combination thereof.

The memory 904 includes a main memory 912, a static memory 914, and a storage unit 916, both accessible to the processors 902 via the bus 940. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the Processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various example embodiments, the I/O components 938 may include user output components 924 and user input components 926. The user output components 924 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope). The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 934 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface Component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and/or memory of the processors 902) and/or storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed embodiments.

The instructions 908 may be transmitted or received over the network 920, using a transmission medium, via a network interface device (e.g., a network interface Component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Figure 10:
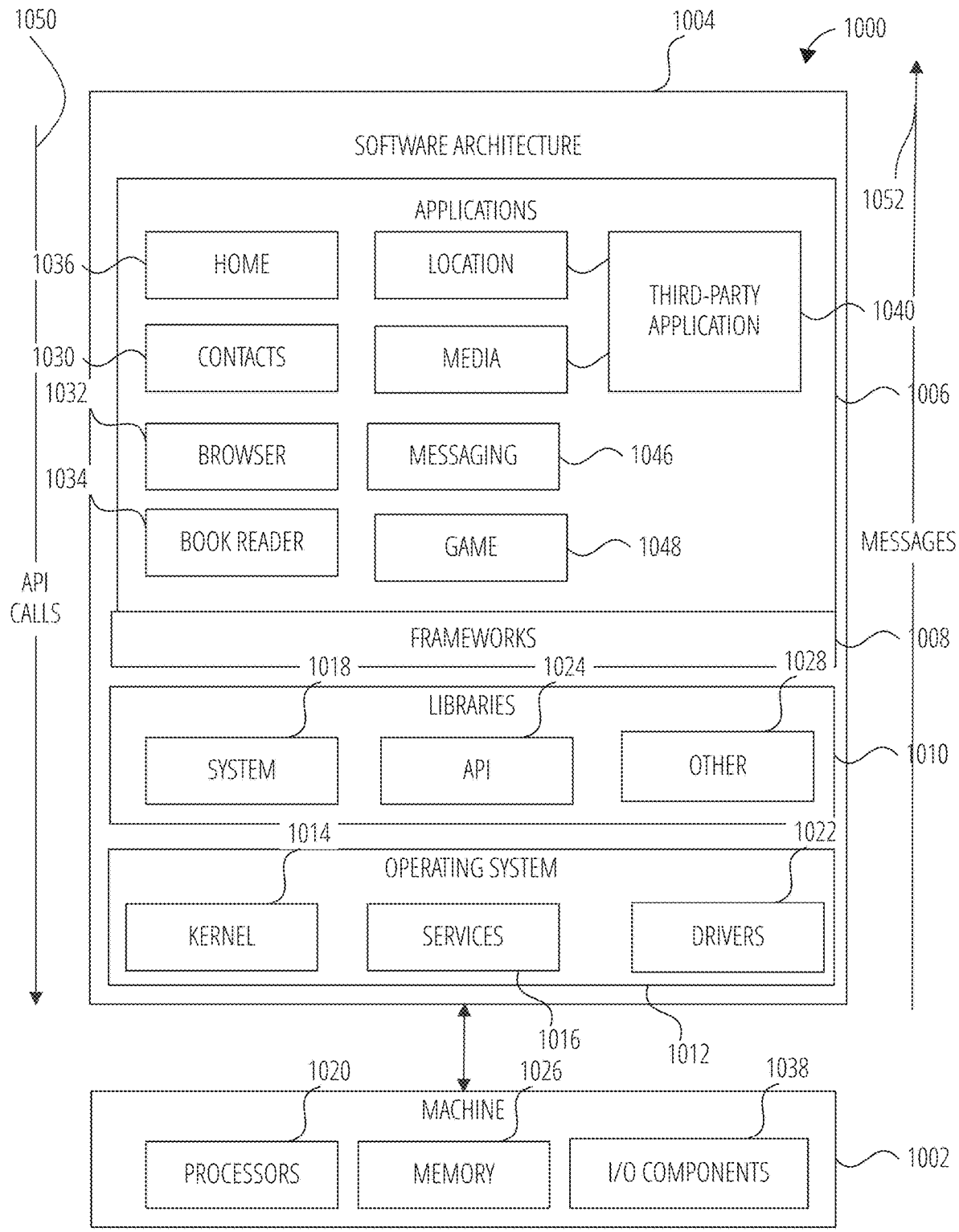
FIG. 10 is block diagram showing a software architecture within which the present disclosure may be implemented, according to an example embodiment.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, Processor management (e.g., scheduling), Component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example embodiment, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The e applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

What is claimed is:

1. A method comprising:
   generating, by a first device, a positioning data based on an analysis of a data stream by identifying a position or a pose of a skeleton or a face of a user of a second device in a camera frame, wherein the data stream comprises images of the user of the second device;

receiving, by the first device, a biometric data of the second user from the second device, the biometric data being based on an output from a sensor or a camera included in the second device; and determining, by the first device, a distance of the user from the first device using the positioning data and the biometric data of the user.

2. The method of claim 1, further comprising:
capturing a video of the second user, wherein the data stream is the video of the second user.

3. The method of claim 1, wherein the biometric data of the user is a size of a face of the user.

4. The method of claim 1, wherein the biometric data of the second user based on output from a depth sensor or binocular cameras included in the second device.

5. The method of claim 1, wherein the first device and second device are included in a shared augmented reality (AR) session.

6. The method of claim 5, wherein the shared AR session comprises a real-time messaging session.

7. A device comprising:
a processor; and
a memory having instructions stored thereon, when executed by the processor, causes the device to perform operations comprising:
capturing, using a camera included in the device, a data stream comprising images of a user of a second device;
generating a positioning data based on an analysis of the data stream by identifying a position or a pose of a skeleton or a face of the user in a camera frame;
generating a biometric data of the second user from the second device, the biometric data being based on an output from a sensor or a camera included in the second device; and
determining a distance of the user from the device using the positioning data and the biometric data of the user.

8. The device of claim 7, wherein the data stream is a video of the second user.

9. The device of claim 7, wherein the biometric data of the second user is a size of a face of the second user.

10. The device of claim 7, wherein the biometric data of the second user based on output from a depth sensor or binocular cameras included in the second device.

11. The device of claim 7, wherein the device and the second device are included in a shared augmented reality (AR) session.

12. The device of claim 11, wherein the shared AR session comprises a real-time messaging session.

13. A non-transitory computer-readable storage medium having stored thereon instructions, when executed by a processor of a first device, causes the processor to perform operations comprising:
capturing, using a camera, a data stream comprising images of a user of a second device;
generating a positioning data based on an analysis of the data stream by identifying a position or a pose of a skeleton or a face of the user in a camera frame;
generating a biometric data of the second user from the second device, the biometric data being based on an output from a sensor or a camera included in the second device; and
determining a distance of the user from the first device using the positioning data and the biometric data of the user.

14. The non-transitory computer-readable storage medium of claim 13, wherein the data stream is a video of the second user.

15. The non-transitory computer-readable storage medium of claim 13, wherein the biometric data of the second user is a size of a face of the second user.

16. The non-transitory computer-readable storage medium of claim 13, wherein the biometric data of the second user based on output from a depth sensor or binocular cameras included in the second device.

17. The non-transitory computer-readable storage medium of claim 13, wherein the first device and the second device are included in a shared augmented reality (AR) session.

18. The non-transitory computer-readable storage medium of claim 17, wherein the shared AR session comprises a real-time messaging session.

* * * * *

UNITED STATES PATENT AND TRADEMARK OFFICE
CERTIFICATE OF CORRECTION

PATENT NO. : 11,887,322 B2  
APPLICATION NO. : 18/165201  
DATED : January 30, 2024  
INVENTOR(S) : Cowburn et al.

Page 1 of 1

It is certified that error appears in the above-identified patent and that said Letters Patent is hereby corrected as shown below:

In the Claims

In Column 19, Line 1, in Claim 1, before "user", insert --second--

In Column 19, Line 3, in Claim 1, before "user", insert --second--

In Column 19, Line 8, in Claim 1, before "user", insert --second--

In Column 19, Line 10, in Claim 1, before "user.", insert --second--

In Column 19, Line 15, in Claim 3, before "user", insert --second--

In Column 19, Line 15, in Claim 3, before "user.", insert --second--

In Column 19, Line 30, in Claim 7, before "user", insert --second--

In Column 19, Line 33, in Claim 7, before "user", insert --second--

In Column 19, Line 38, in Claim 7, before "user", insert --second--

In Column 19, Line 39, in Claim 7, before "user.", insert --second--

In Column 20, Line 14, in Claim 13, before "user", insert --second--

In Column 20, Line 17, in Claim 13, before "user", insert --second--

In Column 20, Line 22, in Claim 13, before "user", insert --second--

In Column 20, Line 24, in Claim 13, before "user.", insert --second--

Signed and Sealed this  
Eighth Day of April, 2025

Coke Morgan Stewart  
*Acting Director of the United States Patent and Trademark Office*